(12) United States Patent
Seo et al.

(10) Patent No.: US 10,442,332 B2
(45) Date of Patent: Oct. 15, 2019

(54) SEAT BACKREST AND SEAT INCLUDING THE SAME

(71) Applicant: BASF SE, Ludwigshafen (DE)

(72) Inventors: Hee Won Seo, Gangnam-gu (KR); Martin Baumert, Dossenheim (DE); Tsung-Chieh Cheng, Ludwigshafen (DE); Sangcheol Jun, Incheon (KR); Daewoo Lee, Incheon (KR); Sunghyun Kang, Incheon (KR)

(73) Assignee: BASF SE, Ludwigshafen (DE)

( * ) Notice: Subject to any disclaimer, the term of this patent is extended or adjusted under 35 U.S.C. 154(b) by 106 days.

(21) Appl. No.: 15/543,658

(22) PCT Filed: Jan. 14, 2016

(86) PCT No.: PCT/EP2016/050682
§ 371 (c)(1),
(2) Date: Jul. 14, 2017

(87) PCT Pub. No.: WO2016/113358
PCT Pub. Date: Jul. 21, 2016

(65) Prior Publication Data
US 2017/0368973 A1    Dec. 28, 2017

(30) Foreign Application Priority Data

Jan. 16, 2015 (CN) .......................... 2015 1 0024271
Jan. 16, 2015 (CN) .......................... 2015 2 0033534

(51) Int. Cl.
*B60N 2/68* (2006.01)
*B60N 2/70* (2006.01)

(52) U.S. Cl.
CPC ............. *B60N 2/682* (2013.01); *B60N 2/686* (2013.01); *B60N 2/7029* (2013.01)

(58) Field of Classification Search
CPC .......... B60N 2/682; B60N 2/68; B60N 2/686; B60N 2/7029; B60N 2/2252; B60N 2002/024
(Continued)

(56) References Cited

U.S. PATENT DOCUMENTS 8,783,780 B2 * 7/2014 Hoshi .................. B60N 2/0232
297/452.18
8,894,154 B2 * 11/2014 Kulkarni ................ B60N 2/682
297/452.1

(Continued)

FOREIGN PATENT DOCUMENTS

FR   2 949 398 A1   3/2011
WO   2008/019981 A1   2/2008
WO   2010/101874 A1   9/2010

OTHER PUBLICATIONS

International Search Report dated May 4, 2016 in PCT/EP2016/050682 filed Jan. 14, 2016.
(Continued)

*Primary Examiner* — Mark R Wendell
(74) *Attorney, Agent, or Firm* — Oblon, McClelland, Maier & Neustadt, L.L.P.

(57) ABSTRACT

A seat backrest is provided, comprising a framework (1) including an upper portion (10), a lower portion (20), a central support portion (40) and two side portions (30) formed integrally by injection molding a thermoplastic material; and an elongated reinforcement (60) embedded in the side portion (30) and the central support portion (40) by overmolding and extending along the side portion (30), the reinforcement (60) being configured to bend along a boundary (35) between the side portion (30) and the central support portion (40). A seat including the backrest is also provided.

16 Claims, 6 Drawing Sheets

(58) Field of Classification Search
USPC .................................................. 297/452.18
See application file for complete search history.

(56) References Cited

U.S. PATENT DOCUMENTS

| | | | |
|---|---|---|---|
| 2005/0116104 A1* | 6/2005 | Savin | E04H 1/125 |
| | | | 244/118.5 |
| 2008/0038569 A1 | 2/2008 | Evans et al. | |
| 2011/0316320 A1 | 12/2011 | Kulkarni et al. | |
| 2012/0169103 A1 | 7/2012 | Renault et al. | |
| 2013/0119743 A1 | 5/2013 | Evans et al. | |
| 2013/0320742 A1 | 12/2013 | Murolo et al. | |
| 2016/0221485 A1* | 8/2016 | Harris | B32B 27/38 |
| 2016/0288678 A1* | 10/2016 | Berry | B60N 2/565 |

OTHER PUBLICATIONS

U.S. Appl. No. 15/543,869, filed Jul. 14, 2017, Hee Won Seo, et al.

* cited by examiner

US 10,442,332 B2

SEAT BACKREST AND SEAT INCLUDING THE SAME

CROSS-REFERENCE TO RELATED APPLICATIONS

This application is a National Stage entry under 35 USC 371 of PCT/EP2016/050682, filed on Jan. 14, 2016, and claims priority to Chinese Patent Application No. 201510024271.5, filed on Jan. 16, 2015, and Chinese Patent Application No. 201520033534.4, filed on Jan. 16, 2015.

TECHNICAL FIELD

The present invention relates to a seat backrest used in particular in an automobile seat.

BACKGROUND ART

As one of the most important parts of a seat of a vehicle, in particular of an automobile, backrest is used for supporting the lumbar and back regions of an occupant and for absorbing impact forces applied by the occupant in particular in the event of a crash accident to provide sufficient cushion.

A seat backrest mainly includes a framework and a cushion covering the framework. As a load supporting structure, the framework is traditionally made of a metallic material, such as carbon steel. However, the high density of the carbon steel is not good for reducing weight of the seat and the vehicle. Therefore, the use of carbon steel must be minimized to reduce weight, which limits the size and loading area of the backrest framework. For example, the lower portion and side portions of the backrest framework can only be formed into slats or bars having relatively smaller loading areas, thereby impairing the strength and stiffness and not favorable for absorbing and distributing impact forces. Also, the central support portion of the backrest, as a directly loading part, has to be additionally manufactured into separate spring support members of smaller dimension and greater elasticity and to be assembled onto the framework via additional steps. Generally speaking, the seat backrests currently available as described above suffer from the following drawbacks: heavy weight, imperfect impact energy absorbing effect and comfort, unsatisfactory manufacturability and less freedom of design. In addition, it has been always desirable to design the seat backrest so as to save internal space of the vehicle.

The PCT application WO2010/101874A1 discloses a seat back including a backrest formed of a first polymeric material, a bracket formed of a different material than the first polymeric material and anchored to the backrest, and a reinforcing composite layer formed of a second polymeric material and a plurality of fibers and melt bonded to the backrest. However, the seat back proposed by WO2010/101874A1 is complicated in manufacturing process and has insufficient strength.

The present invention aims to solve one or more of the above and/or other problems in the prior art.

SUMMARY OF THE INVENTION

In one aspect, the present invention provides a seat backrest, comprising: a framework including an upper portion, a lower portion, a central support portion and two side portions formed integrally by injection molding a thermoplastic material; and an elongated reinforcement embedded in the side portion and the central support portion by overmolding and extending along the side portion, the reinforcement being configured to bend along a boundary between the side portion and the central support portion.

Since the whole framework of the seat backrest is integrally formed by injection molding a thermoplastic material that is lighter than metal e.g. carbon steel, it is possible to reduce the weight of the framework, simplify the manufacture process, and improve the designing freedom of the framework; also, the loading areas of various portions of the framework can be increased and thus facilitates absorption and distribution of impact forces and improvement of seat comfort. In addition, by the design of such a reinforcement that is embedded across both the side portion and central support portion of the backrest framework by overmolding and bent along the boundary between the side portion and central support portion, it is possible to increase the stiffness and strength of the reinforcement itself and strengthen the joint between the side portion and the central support portion.

Advantageously, a part of the reinforcement, that is embedded in the side portion, may also be bent in such a way that the whole cross section of the reinforcement is generally S-shaped. Such a generally S-shaped configuration of the reinforcement is capable of further improving its stiffness and strength.

Advantageously, at least a part of the side portion, that is connected with the upper portion, may include a base wall and two side walls so as to have a generally U-shaped cross section, and the part of the reinforcement, that is embedded in the side portion, extends within the base wall and one of the side walls of the U shape, and extends to the central support portion in such a way that the whole cross section of the reinforcement is generally S-shaped. Such unique multi-curved surface designs of the side portion and the S-shaped reinforcement make it possible to improve the stiffness and strength and reduce the weight of the side portion.

Advantageously, a plurality of ribs may be provided within the opening of the U-shape so as to be firmly connected with the base wall and/or side walls for reinforcing the side portion. With such ribs, it is possible to minimize buckling of the side portion and to improve the capability of absorbing impact energy at crash.

Advantageously, the ribs may have a cross section of linear shape, X shape or zigzag shape to suit the priorities of weight reduction, stiffness and absorption of impact energy.

Advantageously, a lower end of the side portion may define a mounting area for assembly of a seat recliner, and the mounting area is provided with a plurality of reinforcing ribs so as to have high strength, high stiffness and high capability of absorbing impact energy.

Advantageously, the plurality of reinforcing ribs within the mounting area have different shapes, sizes and orientations to build a mounting area for assembly of a seat recliner.

Advantageously, the reinforcement may be formed of a sheet-like material. This helps to reduce weight and facilitates the manufacturing.

Advantageously, the reinforcement may extend over the entire seat height between the upper portion and the lower portion. This secures reinforcement of the whole side portion of the backrest framework.

Advantageously, the central support portion and/or the lower portion may be sheet-like in shape. This configuration increases the loading areas of various portions of the framework and thus facilitates absorption and distribution of impact forces and improvement of seat comfort.

Advantageously, the upper portion, the lower portion and the central support portion may form altogether in a vertical cross section a back contour of generally non-zero Gaussian curvature.

This configuration is capable of thinning the seat backrest so as to save space within the vehicle, especially for the rear occupants, and also improving the stiffness of the backrest.

Advantageously, the thermoplastic material may be polyamide and preferably reinforced by fibers, e.g. glass or carbon fibers with a length ranging from 0.1 to 1.2 mm, preferably from 0.2 to 0.4 mm.

Advantageously, the reinforcement may be formed of a thermoplastic material reinforced by continuous fibers.

Advantageously, the reinforcement may be formed by thermal pressing multiple layers of thermoplastic material reinforced by unidirectional continuous fibers, or may be formed by thermal pressing one layer of thermoplastic material reinforced by bidirectional continuous fibers in woven form.

In another aspect, the present invention provides a seat including the seat backrest as described above.

Advantageously, the seat may be an automobile seat.

DETAILED DESCRIPTION OF THE EMBODIMENTS

The present invention will be described hereinafter by way of specific embodiments with reference to the drawings.

Figure 1:
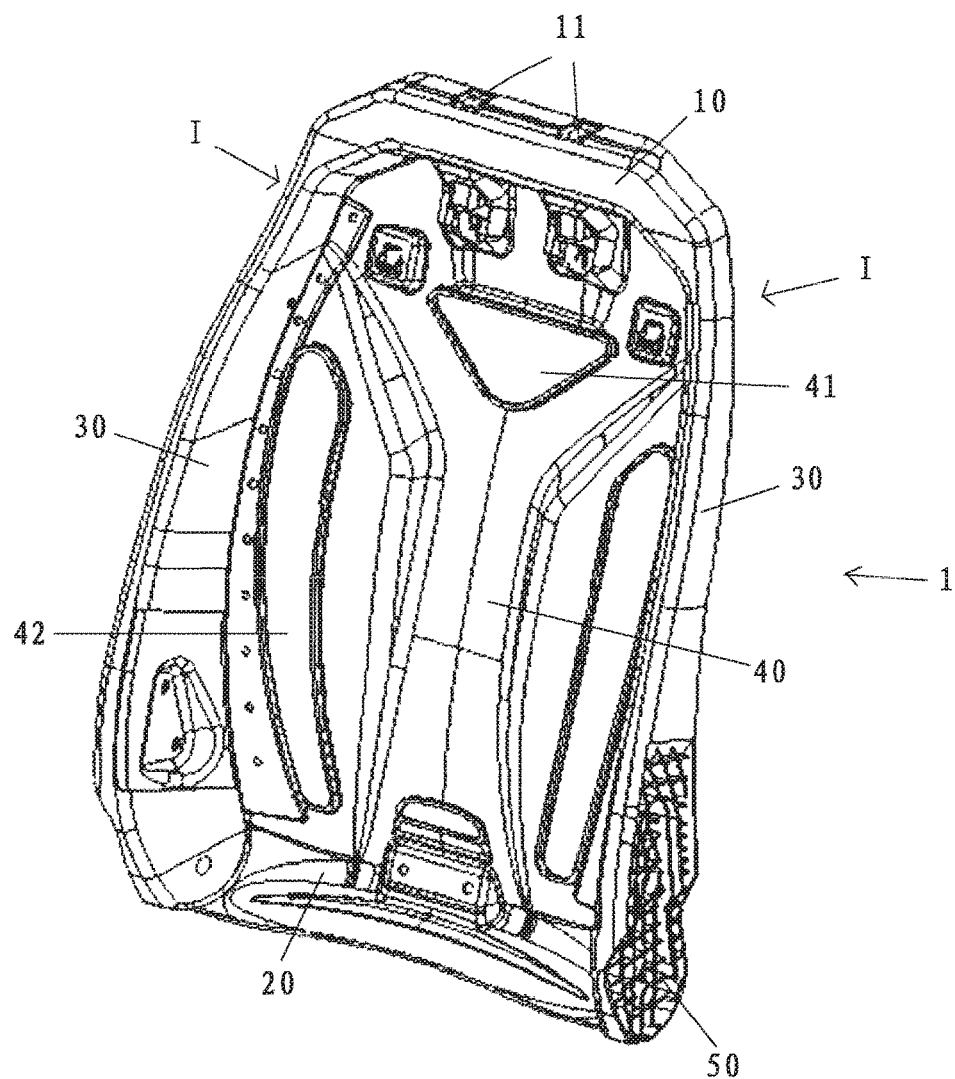
FIG. 1 is a perspective view of a seat backrest according to an embodiment of the invention.

FIG. 1 is a perspective view showing an exemplary configuration of the seat backrest according to the invention. The seat backrest, as shown, is in an upright state, which is also the general use state when it is mounted in a vehicle (e.g. automobile). The seat backrest includes a framework 1 having an upper portion 10, a lower portion 20, a central support portion 40, left and right side portions 30 formed integrally as a piece by injection molding thermoplastic materials. The upper portion 10 and the lower portion 20 are generally horizontal, and the two side portions 30 are generally vertical and bilaterally symmetrical. The upper portion 10 is generally in the shape of an inverted U and the cross section thereof tapers towards tip ends of the U-shape. The two side portions 30, with the cross sections thereof generally tapering upwards, are joined integrally with the ends of the U-shaped upper portion 10 at positions indicated by arrows I in FIG. 1. The two side portions 30 may be arranged in such a posture that they flare towards the frontal side of the seat backrest, and are connected to the upper portion 10 and the lower portion 20 sequentially to form an enclosed frame in which the central support portion 40 for directly supporting the back of an occupant is disposed, such that the portions 10, 20, 30, 40 together define a recessed cavity in the frontal side of the seat backrest for receiving a backrest cushion. In order to reduce weight or for the need of styling, the central support portion 40 may be provided with one or more openings 41, 42. Various features of the seat backrest may be defined in respective portions of the framework 1, for instance, headrest guides 11 may be defined in the upper portion 10 for receiving a headrest, and a mounting area 50 may be formed in a lower end of the side portion 30 for connecting the seat backrest and the recliner.

The whole framework 1 is formed as a piece by injection molding of thermoplastic material that is lighter than metal e.g. carbon steel, which not only reduces the weight of the framework but simplifies the manufacture process due to omission of steps of individually fabricating and assembling different parts of the framework. In addition, the injection molding technique makes it possible to produce different portions of the framework 1 into a variety of complex configurations and thus improves the design freedom of the framework 1. For example, the shape and number of the openings in the central support portion 40 may be set flexibly so as to enable adjustment of the stiffness, loading area and appearance of the central support portion. Additionally, unlike the metal framework which is limited by weight requirement, the central support portion 40 and/or the lower portion 20 of the backrest framework 1 of the present invention may be designed to be sheet-like in shape so that the loading area can be increased as compared with the central support portion in the form of spring support members and the lower portion in the form of a bar in the prior art; also, it is possible to make the loading area of the side portion 30 in the present invention larger than in the prior art. This facilitates absorption and distribution of impact forces and improvement of seat comfort.

The thermoplastic material for producing the framework 1 may be polyamide and preferably reinforced by no more than 60 mass % of glass or carbon fibers having a length ranging from 0.1 to 1.2 mm, preferably from 0.2 to 0.4 mm, e.g. Ultramid® produced by BASF.

Figure 2:
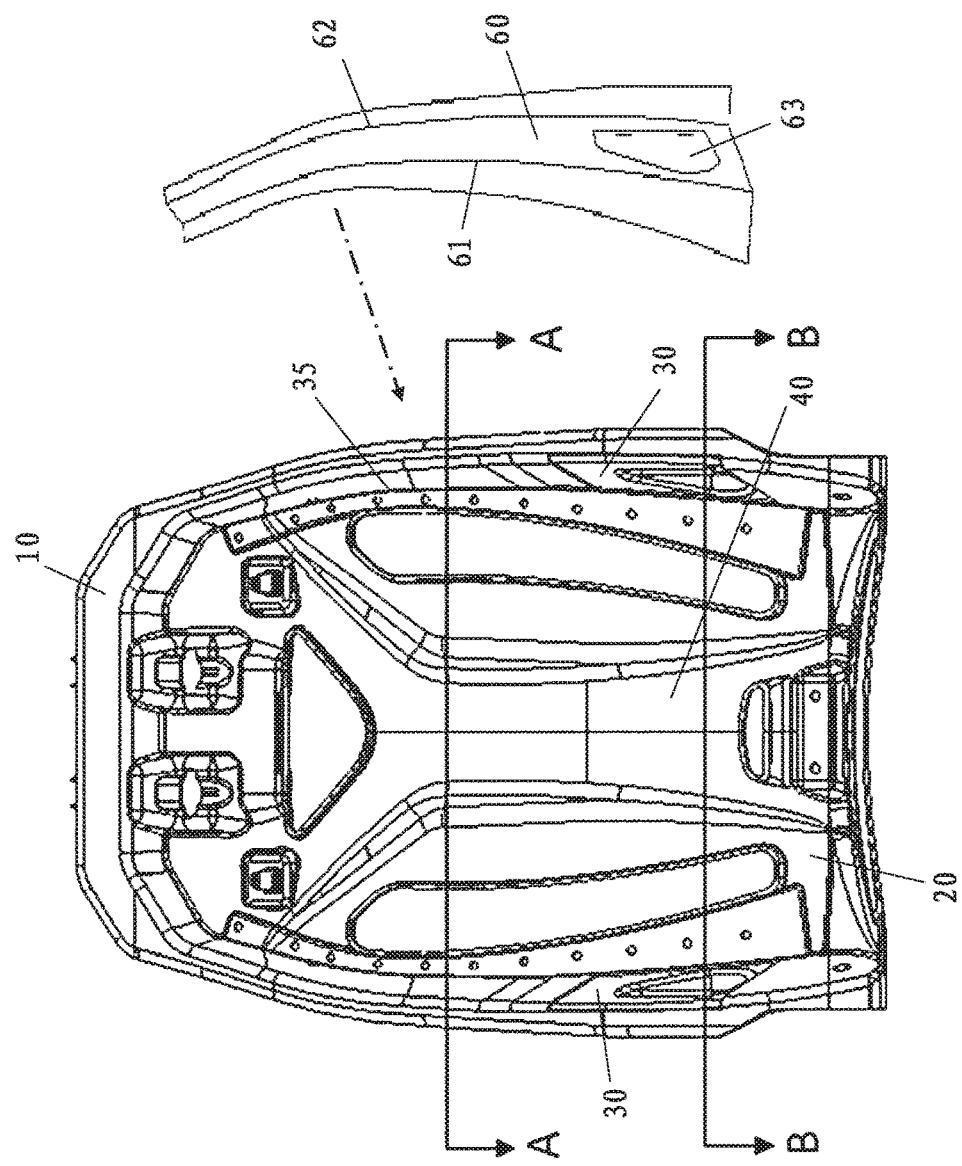
FIG. 2 is a front view of the seat backrest shown in FIG. 1.

The side portions of the backrest framework are critical parts for absorbing impact energy, so the stiffness and strength thereof should be secured in particular. In order to improve stiffness and strength of the side portions of the backrest framework made from thermoplastic material according to the invention, the seat backrest of the invention, as shown in FIG. 2, further includes a reinforcement 60 partially embedded/inserted in the side portion 30 of the framework 1 by overmolding (see the dash dot line arrow in FIG. 2). The reinforcement 60 extends along the side portion 30 and is in an elongated shape. Two reinforcements 60 are provided within the two symmetrical side portions 30, respectively, with the same structure and bilaterally symmetrical disposition. Hereinafter merely one of the reinforcements 60 as shown in FIG. 2 will be described.

Part of the reinforcement 60 is embedded in the side portion 30, while another part thereof is embedded in the central support portion 40 by overmolding in such a way that the reinforcement 60 is bent along a boundary 35 between the side portion 30 and the central support portion 40, and the reinforcement 60 itself thus has a bend 61. Such a configuration of the reinforcement 60 not only increases its own stiffness and strength but strengthens joint between the side portion 30 and the central support portion 40.

According an advantageous configuration, the part of the reinforcement 60 embedded in the side portion 30 also bends and thus is formed with another bend 62. Hence, the reinforcement 60 has a generally S-shaped cross section with two bends 61, 62. It should be noted that the S-shape herein also covers the shape obtained by inverting the normal S-shape laterally or upside down (e.g. the shape of the cross section of the reinforcement 60 shown in the right side of FIG. 3). The generally S-shaped configuration of the reinforcement 60 is capable of further improving the stiffness and strength against impact forces of itself and thus of the side portion 30. The reinforcement 60 may be formed, as a whole, of a sheet-like material with a relatively thinner cross section so as to reduce weight and facilitate manufacturing thereof. The lower portion of the reinforcement 60 may be provided with a pocket 63 for passing through fasteners used to connect the seat backrest and the seat pan.

Advantageously, the length of the reinforcement 60, as shown in FIG. 2, may be set to extend over almost the entire seat height between the upper portion 10 and the lower portion 20 of the framework 1, which facilitates reinforcing the whole side portion 30. Nevertheless, the present invention is not limited to this, and it is possible to shorten the reinforcement as appropriate according to forces applied thereto.

The reinforcement 60 may be preferably formed by a thermoplastic material reinforced by unidirectional continuous fibers (such as glass fibers or carbon fibers), e.g. Ultratape® produced by BASF, or by a thermoplastic material reinforced by bidirectional continuous fibers (such as glass fibers or carbon fibers) in woven form, e.g. Ultralaminate® produced by BASF. Advantageously, the reinforcement 60 may be formed by thermal pressing multiple layers of thermoplastic materials reinforced by unidirectional continuous fibers mentioned above, or one layer of thermoplastic materials reinforced by bidirectional continuous fibers mentioned above.

Figure 3:
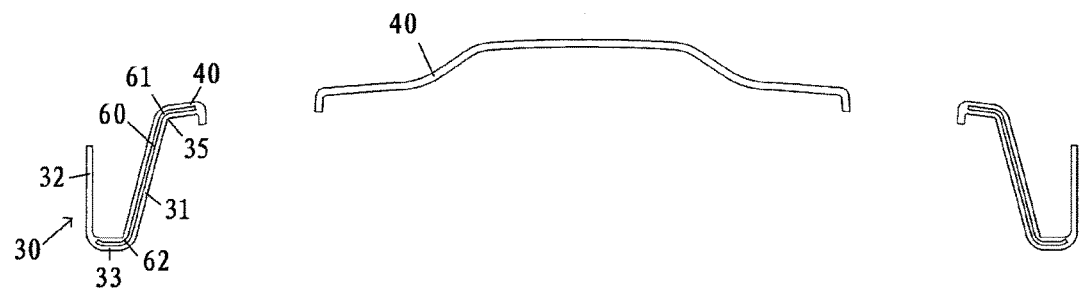
FIG. 3 is a sectional view taken along line A-A of FIG. 2.

Advantageously, at least a part of the side portion 30, that is connected with the upper portion 10 of the framework, (preferably, such part extends from the upper portion 10 over half of the length of the side portion 30) includes a base wall 33 and two side walls 31, 32 so as to have a generally U-shaped cross section, as shown in FIG. 3, wherein the part of the reinforcement 60 embedded in the side portion 30 extends following the shape of the base wall 33 and one side wall 31 of the U shape, and embedded entirely or partially within the base wall 33 and the side wall 31. Such a unique multi-curved surface design of the side portion 30 makes it possible to improve the stiffness and strength and reduce the weight of the side portion.

Figure 4:
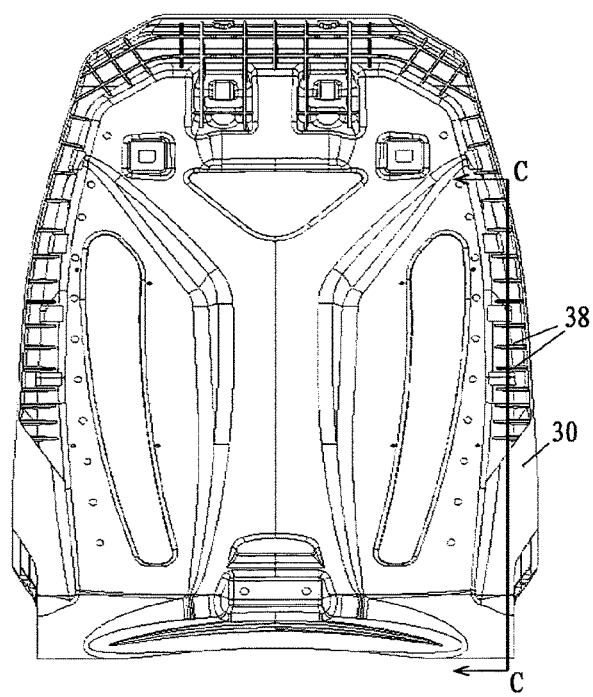
FIG. 4 is a back view of the seat backrest shown in FIG. 1.
Figure 5:
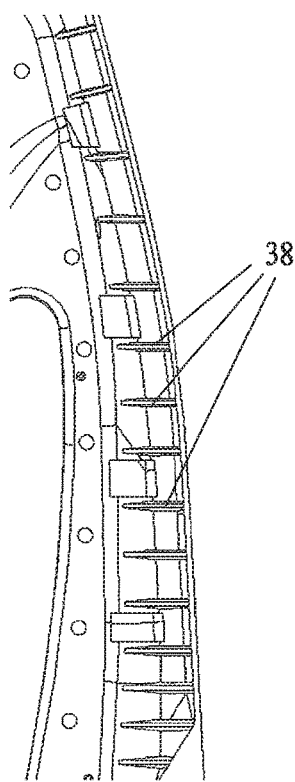
FIG. 5 is an enlarged view of the side portion 30 shown in FIG. 4.
Figure 6:
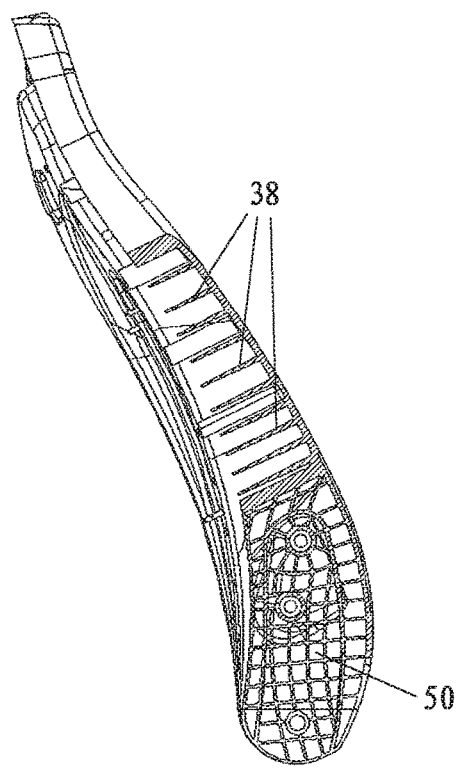
FIG. 6 is a sectional view taken along line C-C of FIG. 4.

In addition, as shown in FIGS. 4-6, in the above-mentioned part of the side portion 30 that has a generally U-shaped cross section, a plurality of ribs 38 are provide within the opening of the U shape, and are fixedly connected with the base wall 33 and/or side walls 31, 32 so as to reinforce the side portion 30 by minimizing buckling thereof under impact forces. The cross section of the ribs may be e.g. linear shape (as shown), X shape or zigzag shape.

Figure 7:
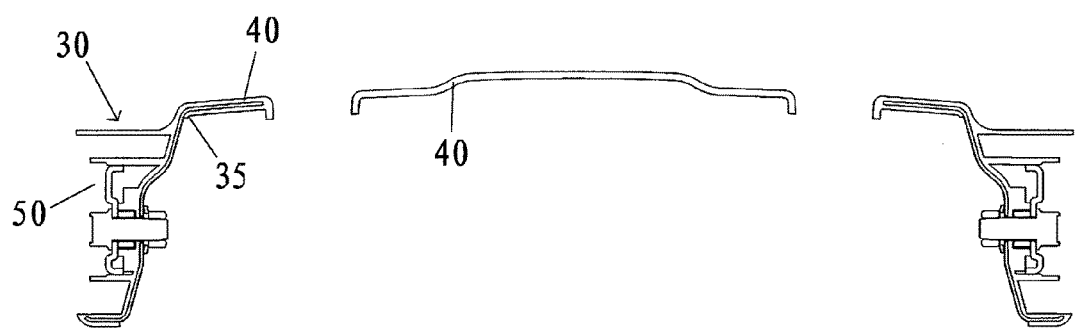
FIG. 7 is a sectional view taken along line B-B of FIG. 2.
Figure 8:
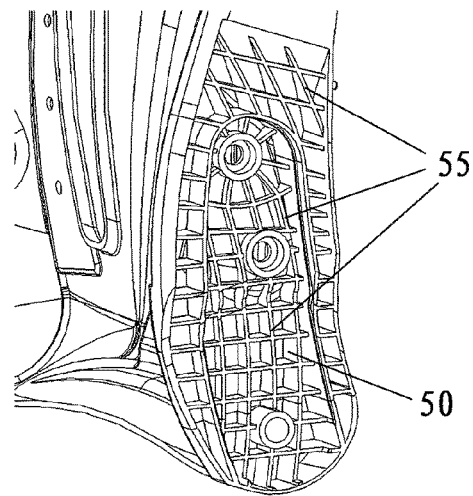
FIG. 8 is an enlarged view of the mounting area 50 shown in FIG. 1.

As shown in FIGS. 1, 7 and 8, the lower end of the side portion 30 has been shaped to a special form, which offers a mounting area 50 for assembly of the recliner of the seat pan. The mounting area 50 is built up with a plurality of reinforcing ribs 55 that may have different shapes, sizes and orientations. For example, in the illustrated example, the plurality of ribs 55 intersect one another to form a meshed structure having meshes of regular or irregular polygonal shape (e.g. the irregular quadrangular shape as shown in the figures). Such a configuration ensures sufficient stiffness and strength required by the side portion 30 when e.g. it is assembled with the seat recliner and connected to the seat pan. Furthermore, the seat backrest framework including the mounting area is made as a piece by injection molding of thermoplastic materials and designed in a way that the impact energy at crash can partly be absorbed by the framework and partly be transferred to the seat pan through the mounting area and the recliner.

Figure 9:
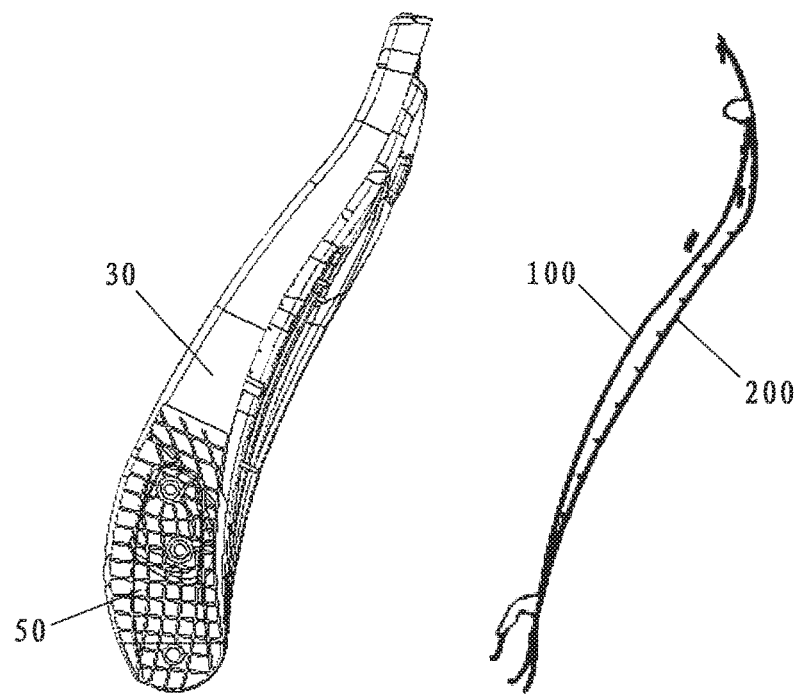
FIG. 9 is a side view of the seat backrest shown in FIG. 1 and shows a comparison between a back contour curve thereof and a back contour curve of a prior seat backrest.
Figure 10:
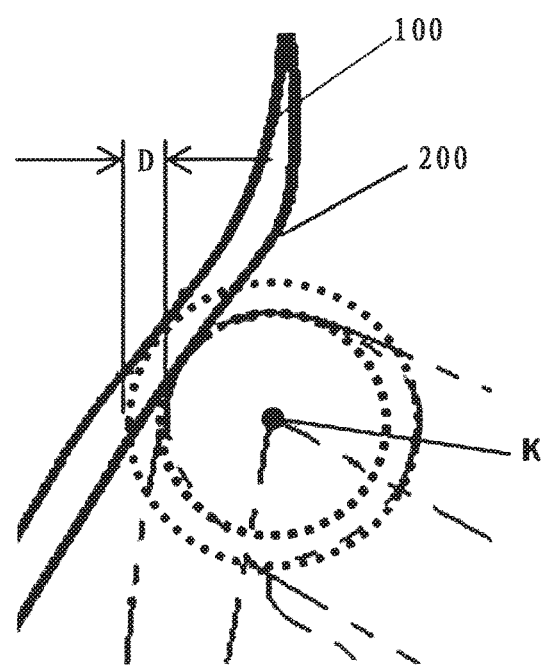
FIG. 10 is a diagram explaining the comparison between the back contour curve of the seat backrest according to the invention and the back contour curve of the prior seat backrest.

As stated above, since the framework of the seat backrest of the invention is formed by injection molding the thermoplastic material, the freedom of its design is high and a variety of complex configurations can be formed. On this basis, as shown in FIG. 9, it may be envisaged in the present invention that the general back contour of the upper portion 10, lower portion 20 and central support portion 40 of the framework 1 in a vertical cross section exhibits a generally non-zero Gaussian curve, like the curve 100 as shown in FIGS. 9 and 10. For the purpose of comparison, another curve 200 in FIGS. 9 and 10 shows a back contour of a metallic framework in the prior art. Due to the difficulty and limitation in shaping of the metallic framework, the curve 200 only includes two generally linear sections angled relative to each other, while the back contour curve 100 (non-zero Gaussian curve) formed by injection molding the thermoplastic material exhibits a more flexible and complex configuration. As shown in FIG. 10, the curve 100 is more upright than the curve 200 in the same posture of the seat backrest, so that the seat backrest can be thinned relative to the prior art. When the seat backrest of the invention is applied to a front seat of an automobile, as compared with a prior art seat backrest, a larger spatial distance D can be provided for knees (indicated by knee point K in FIG. 10) of an occupant seated on a rear seat. In other words, the seat backrest of the invention using a generally non-zero Gaussian curved back contour can save internal space of a vehicle and improve seating comfort. In addition, the stiffness of the backrest can be improved by the non-zero Gaussian curved back contour.

Apparently, various modifications and improvements may be made to the embodiments set forth above by those skilled in the art without departing from the scope or spirit of the present invention. Other embodiments of the invention are obvious for those skilled in the art through practice of the present disclosure. The embodiments disclosed herein shall be considered exemplary only and the true scope of the invention is defined by the following claims and equivalents thereof.

REFERENCE NUMERAL LIST 1 framework
10 upper portion
11 headrest guides
20 lower portion
30 side portions
31 side wall
32 side wall
33 base wall
35 boundary
38 plurality of ribs
40 central support portion
41 opening
42 opening
50 mounting area 55 reinforcing ribs
60 reinforcement
61 bend
62 another, further bend
63 pocket
100 back contour curve
200 curve according to prior art

The invention claimed is:

1. A seat backrest, comprising:
   a framework comprising an upper portion, a lower portion, a central support portion and two side portions obtained by integrally injection molding a thermoplastic material; and
   an elongated reinforcement embedded in a first side portion of the two side portions and the central support portion by overmolding, extending along the first side portion,
   wherein the reinforcement is configured to bend along a boundary between the first side portion and the central support portion,
   a part of the reinforcement, that is embedded in the first side portion, is also bent in such a way that a whole cross section of the reinforcement is generally S-shaped,
   at least a part of the first side portion, that is connected with the upper portion, comprises a base wall and two side walls so as to have a generally U-shaped cross section, and
   the part of the reinforcement, that is embedded in the first side portion, extends within the base wall and one of the side walls of the U shape of the U-shaped cross section, and extends to the central support portion in such a way that the whole cross section of the reinforcement is generally S-shaped,
   wherein at least one of the central support portion and the lower portion is sheet-like in shape, and
   wherein the upper portion, the lower portion and the central support portion form altogether in a vertical cross section a back contour of generally non-zero Gaussian curvature.

2. The seat backrest according to claim 1, further comprising a plurality of ribs within the opening of the U-shape, fixedly connected with the base wall and/or side walls and thereby reinforcing the side portion.

3. The seat backrest according to claim 2, wherein the ribs have a cross section of linear shape, X shape, or zigzag shape.

4. The seat backrest according to claim 1, wherein a lower end of the side portion comprises a mounting area suitable for assembly of a seat recliner, and the mounting area comprises a plurality of reinforcing ribs.

5. The seat backrest according to claim 1, wherein the reinforcement comprises a sheet-like material.

6. The seat backrest according to claim 1, wherein the reinforcement extends over the entire seat height between the upper portion and the lower portion.

7. The seat backrest according to claim 1, wherein the thermoplastic material is polyamide reinforced by fibers.

8. The seat backrest according to claim 7, wherein the fibers are glass or carbon fibers with a length of from 0.1 to 1.2 mm.

9. The seat backrest according to claim 8, wherein the glass or carbon fibers have a length of from 0.2 to 0.4 mm.

10. The seat backrest according to claim 7, wherein polyamide is reinforced by no more than 60 mass % of the fibers.

11. The seat backrest according to claim 1, wherein the reinforcement comprises a thermoplastic material reinforced by continuous fibers.

12. The seat backrest according to claim 11, wherein the reinforcement is obtained by thermal pressing multiple layers of thermoplastic material reinforced by unidirectional continuous fibers.

13. The seat backrest according to claim 11, wherein the reinforcement is obtained by thermal pressing one layer of thermoplastic material reinforced by bidirectional continuous fibers in woven form.

14. The seat backrest according to claim 1, wherein the part of the side portion that has a generally U-shaped cross section extends from the upper portion over half of the length of the side portion.

15. A seat, comprising the seat backrest according to claim 1.

16. The seat according to claim 15, wherein the seat is an automobile seat.

* * * * *